Figure 1:
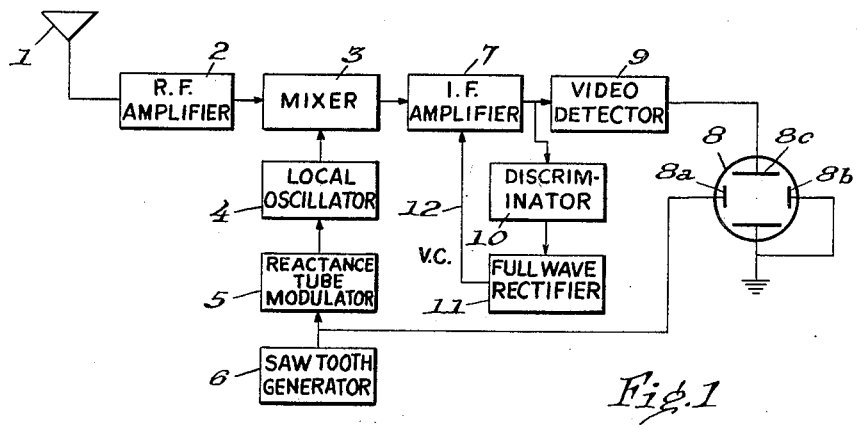

Feb. 28, 1950     J. I. HELLER     2,498,954
PANORAMIC RECEIVER WITH MEANS FOR MODIFYING
SIGNAL PULSES APPLIED TO INDICATORS
Filed May 7, 1946

Inventor
Joseph I. Heller,
By Hyman Hurvitz
his Attorney

Patented Feb. 28, 1950

2,498,954

UNITED STATES PATENT OFFICE 2,498,954

PANORAMIC RECEIVER WITH MEANS FOR MODIFYING SIGNAL PULSES APPLIED TO INDICATORS

Joseph I. Heller, Brooklyn, N. Y., assignor to Panoramic Radio Corporation, New York, N. Y., a corporation of New York Application May 7, 1946, Serial No. 667,848

11 Claims. (Cl. 250—20)

This invention relates generally to pulse sharpening methods and systems and particularly to systems for deriving sharp narrowed pulses for precise indication on the face of an oscilloscopic apparatus.

It is known in the prior art relating to panoramic devices, to sweep or scan a predetermined frequency spectrum periodically, and to indicate the amplitudes of the various frequency components of the said spectrum on the face of a cathode ray indicator as ordinates, frequency values within the spectrum being indicated as abscissae. In such systems even a substantially single frequency signal produces a visual indication on the face of the indicator which follows generally the shape of a resonant circuit, associated with the panoramic device. While for many applications of panoramic devices the above described effect is not deemed to be particularly undesirable, a more nearly ideal indication would be one bearing a closer relation to the actual space in the spectrum occupied by the signal being indicated, particularly since in such case discrimination between adjacent signals will be greatly improved and the determination of the frequency corresponding with any signal indication may be accomplished more accurately and readily than is possible by reading the relatively broad responses usually available.

I propose to add to the normal panoramic device a frequency discriminator circuit of special character to which may be applied signals corresponding with those normally indicated in such devices, and which is arranged and adapted to provide a control voltage which may be utilized sharply to modify the overall response of the panoramic device to any scanned signal, except when that signal is passing through the center of that frequency characteristic of the panoramic device which determines its normal response.

It is, accordingly, an object of my invention to provide a novel pulse sharpening circuit, and particularly a pulse sharpening circuit applicable to panoramic devices.

It is a further object of my invention to provide pulse generating circuits of a novel type.

It is another object of my invention to provide means in a panoramic system for compensating dynamically for the band pass characteristics of certain portions of the system.

It is still another object of my invention to provide means for increasing the definition and for improving the readability of indications provided by visual indicators generally, and visual indicators associated with panoramic devices in particular.

Another object of my invention resides in the provision of devices for narrowing the response of a frequency scanned channel to signals of various character.

It is a further object of my invention to provide devices for deriving sharp pulses from frequency modulated signals, the pulses preferably being applied for producing indications or for controlling such indications in an advantageous manner.

Figure 2A:
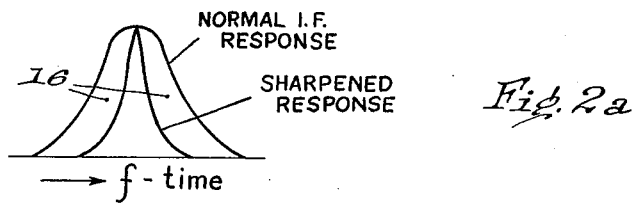
Figure 2B:
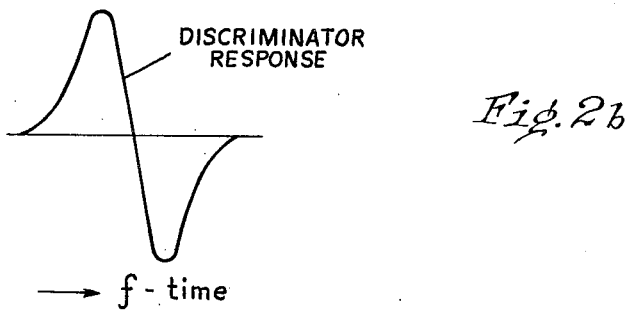
Figure 2C:
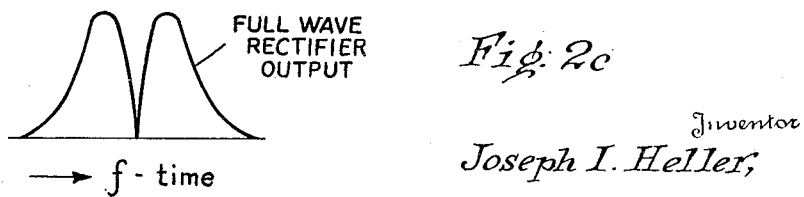

The above and still further objects and advantages of my invention will become clear upon a study of the following detailed description of various embodiments of my invention, when taken in conjunction with the accompanying drawings, wherein:

Figure 1 is a block diagram illustrating schematically an embodiment of my invention; and Figures 2a, 2b and 2c represent certain circuit characteristic curves, having utility in connection with the detailed exposition of my invention.

Referring now to Figure 1 of the drawings, the numeral 1 denotes an antenna, which is coupled to the wide band R. F. amplifier 2 arranged for translating a band of radio frequencies to the mixer 3. Local oscillations are supplied to the mixer for heterodyning with the signals provided by the R. F. amplifier 2, by a local oscillator 4, the latter being frequency modulated by a reactance tube modulator 5 driven by a saw tooth generator 6. In this manner at least a portion of the band of frequencies derivable from the amplifier 2 is scanned at a rate determined by the frequency of the generator 6, and the presence of a signal at any particular R. F. frequency is announced by the production in the mixer 3 of a frequency to which the I. F. amplifier 7 may respond. The voltage provided by the saw tooth generator 6 is utilized to sweep the cathode ray beam of a cathode ray indicator 8 from its rest position in synchronism with the deviation of the frequency of the local oscillator 4 from its rest or unmodulated value, by applying said voltage 6 to a deflection plate 8a of the indicator 8, the opposing plate 8b being grounded.

Signals derived from the I. F. amplifier 7 may be detected in a video detector 9 and applied to plate 8c of the indicator 8.

The above described system of panoramic reception is per se well known in the art, and its principles are explained in United States Patent Number 2,381,940 issued to Wallace et al. on August 14, 1945, on the basis of an application for United States Patent, Serial Number 402,822, dated July 17, 1941.

My improvement requires the derivation from the output of the I. F. amplifier 7 of a signal of frequency varying character, the frequency variation being brought about solely by the sweep of the local oscillator 4. The normal I. F. response curve, illustrated in Figure 2a of the accompanying drawings, and which is assumed to be representative of the I. F. response of the amplifier 7, determines the shape of the normal response of the amplifier 7 to a substantially single frequency signal supplied by the R. F. amplifier 2 to the mixer 3, and the response is normally of the particular character indicated by virtue of the frequency variations of the local oscillator 4.

Application of the output of the I. F. amplifier 7 to a frequency discriminator 10 will result, then, in a discriminator response exemplified by the curve illustrated in Figure 2b of the drawings, this response curve being normal for many frequency discriminators now well known in the art, and detailed circuit description of which is accordingly dispensed with as superfluous.

The signal output of the discriminator 10 is rectified in the full wave rectifier 11, the output signal of which, illustrated in Figure 2 of the drawings, is applied to control the gain of the I. F. amplifier 7, via lead 12, in such phase as to provide reduction in gain in response to the lobes 13 of the rectifier output characteristic, and full gain at the cusp 14 thereof. In this manner the response curve of the amplifier 7 is narrowed dynamically, and only in response to a signal therein, the sharpened response curve being illustrated in Figure 2a for convenience of comparison with the normal response curve, each curve being suitably labelled for purposes of identification. It will be clear that the gain of the amplifier 7 is sharply reduced for any condition except that of zero signal and that of a signal when it passes through the center of the I. F. response characteristic. The area between the curves, and labelled 16 in Figure 2a of the drawings, represents that portion of the normal response of the amplifier 7 which is effectively eliminated by my novel device.

While I have disclosed a circuit in Figure 1, in which the gain control signal provided by the rectifier is applied to the I. F. amplifier 7, it will be apparent that such application represents a matter of choice only, and that gain control voltage might be applied to the R. F. amplifier 2 and/or the I. F. amplifier 7, if desired, or in fact in any manner known in the art for modifying the overall gain of a receiver.

It will further be obvious that while I have illustrated an embodiment of my invention as applied to one particular type of panoramic or frequency scanning device, this is for purposes of exemplification only, the invention having application to any frequency scanning receiver provided with means for visibly indicating or recording receiver response. It is also obvious that modifications of the specific arrangement illustrated and described may be resorted to without violating the spirit of the invention, as defined by the appended claims.

What I claim and desire to secure by Letters Patent of the United States is:

1. In combination in a gain controllable superheterodyne panoramic receiver, a source of radio frequency signals occupying a predetermined relatively wide radio frequency spectrum, a mixer, a frequency scanning local oscillator for generating frequency modulated local oscillations, means for applying said local oscillations to said mixer for frequency conversion therein, a relatively narrow band amplifier for amplifying the products of conversion, means for frequency discriminating the amplified products of conversion comprising a frequency discriminator having zero response to signals having a frequency substantially centrally of the band pass of said amplifier, and substantial response to all signals having frequencies displaced from a frequency substantially centrally of the band pass of said amplifier, means comprising a full wave rectifier responsive to all responses of said discriminator for reducing the gain of said superheterodyne panoramic receiver and means synchronized with frequency scanning of said frequency scanning local oscillator for visually displaying in response to signals derived from said relatively narrow band amplifier the relative amplitudes and frequencies of a spectrum of frequences received by said frequency scanning panoramic receiver.

2. In combination, a source of signals subsisting in a relatively wide frequency spectrum, means for scanning said spectrum and for amplifying sequentially signals derived from said spectrum, voltage responsive means for controlling the gain of said means for scanning said spectrum and for amplifying sequentially signals derived from said spectrum, means comprising a frequency discriminator and a full wave rectifier connected in cascade therewith for deriving from said last mentioned signals gain control voltages for application to said voltage responsive means and means synchronized with said scanning for visually displaying, in response to signals derived from said means for amplifying, the relative frequencies of said spectrum.

3. In combination, in a panoramic receiver of the periodically frequency scanning type, means for providing frequency modulated signals in response to each frequency scan of said receiver, gain controllable means for translating said frequency modulated signals, a frequency discriminator providing alternate positive and negative response signals in response to frequency modulations of said frequency modulated signals, means comprising a full wave rectifier for deriving from said response signals a gain control signal during each cycle of modulations of said frequency modulated signal, said gain control signal having an amplitude characteristic of alternate portions of the same polarity separated by a point of zero amplitude, means for applying said gain control signal to said gain controllable means to control the gain thereof, a cathode ray tube indicator having means for generating a cathode ray beam, means for sweeping said beam in a first path in synchronism with said scanning, and means for actuating said beam in response to signal deriving from said gain controllable means.

4. A frequency scanning panoramic receiver comprising a source of periodic frequency modulated waves generated in response to said scanning, a gain controllable amplifier for said frequency modulated waves, said amplifier having a predetermined pass band and a predetermined gain at each point in said pass band, means comprising a frequency discriminator and full wave rectifier connected in cascade responsive to said frequency modulated waves for generating a periodic gain control voltage for said gain controllable amplifier, having a predetermined value for each frequency of said frequency modulated wave, said gain control voltage having a periodic time law of variation in respect to its amplitude adapted so to vary the gain of said gain controllable amplifier as to reduce said predetermined gain at all points of said pass band except substantially at one point located centrally of said pass band, means for applying said gain control voltage to said gain controllable amplifier for periodically controlling the gain thereof, a cathode ray tube indicator having means for generating a cathode ray beam, means for sweeping said beam in a first path in synchronism with said scanning, and means for actuating said beam in response to signals deriving from said gain controllable amplifier.

5. A frequency scanning panoramic receiver comprising a source of periodically frequency modulated signals generated by said scanning, a frequency discriminator arranged to provide alternately positive and negative response signals in response to said periodically frequency modulated signals, a gain controllable amplifier having a predetermined pass band, and means for substantially reducing the gain of said gain controllable amplifier at the periodicity of said signals substantially to zero at all points of the pass band of said amplifier except at points substantially at the center of said pass band, said last named means comprising a full wave rectifier for converting said alternately positive and negative response signals to alternately uni-directional response signals, a cathode ray tube indicator having means for generating a cathode ray beam, means for sweeping said beam in a first path in synchronism with said scanning, and means for actuating said beam in response to signal deriving from said gain controllable amplifier.

6. A frequency scanning panoramic receiver comprising a source of periodically frequency modulated signals generated by said scanning, a frequency discriminator arranged to provide alternately positive and negative response signals in response to each cycle of modulation of said frequency modulated signals, a gain controllable amplifier for said frequency modulated signals, and means for substantially reducing the gain of said gain controllable amplifier at all points of the pass band of said gain controllable amplifier except at points substantially at the center of said pass band, said last means comprising said frequency discriminator, and means for full wave rectifying said alternately positive and negative response signals of said frequency discriminator, a cathode ray tube indicator having means for generating a cathode ray beam, means for sweeping said beam in a first path in synchronism with said scanning, and means for actuating said beam in response to signal deriving from said gain controllable means.

7. A periodically frequency scanning panoramic receiver comprising a source of periodic frequency modulated signals generated by said scanning, a frequency discriminator arranged to provide alternately positive and negative response signals in response to frequency modulated signals applied thereto, means for applying said frequency modulated signals to said frequency discriminator for frequency discrimination thereby, a full wave rectifier for rectifying said alternately positive and negative response signals provided by said frequency discriminator in response to each cycle of said applied frequency modulated signals to provide alternately uni-directional response signals, an amplifier, gain control signal responsive gain control means for said amplifier, said gain control means being arranged to respond instantaneously to said gain control signals, means for applying said alternately uni-directional response signals in totality to said gain control means as gain control signals, and means synchronized with said frequency scanning for visually displaying in response to signals derived from said gain controllable amplifier the relative frequencies of a spectrum of frequencies received by said frequency scanning panoramic receiver.

8. In combination, means for periodically scanning a signal frequency spectrum including a plurality of discrete signals of different frequencies, means for amplifying signals occurring in successive portions of swept frequency spectrum, said means for amplifying having a predetermined pass band, means responsive to signals derivable from said means for amplifying for reducing the response of said means for amplifying at all points displayed substantially from the center of said pass band, said last named means comprising a frequency discriminator and a full wave rectifier connected in cascade, and means for visually displaying said signals at positions displaced along a base line in accordance with the frequencies of said signals.

9. In combination, in a tunable receiver for wave energy signals, means for periodically tuning said tunable receiver over a predetermined frequency spectrum, a cathode ray tube indicator having means for generating a beam of electrons, means for sweeping said beam of electrons in a first path in synchronism with said tuning means for deriving signal output from said tunable receiver in response to each wave energy signal received thereby during said tuning, means responsive to said signal output for effecting modulation of said cathode ray beam, means comprising a frequency discriminator detector and a full wave rectifier connected in cascade and responsive to said signal output for providing control signal, and means responsive to said control signal for controlling said receiver to modify said modulation.

10. In combination, a tunable receiver for wave energy signals, said tunable receiver comprising a frequency discriminator detector and a full wave rectifier connected in cascade, means for periodically tuning said tunable receiver over a predetermined frequency spectrum, a visual display indicator comprising means for providing a movable indication, means for moving said indication continuously in correspondence with tuning of said receiver, and means comprising said frequency discriminator and full wave rectifier connected in cascade for further moving said movable indication in response to reception of wave energy signals by said tunable receiver during said tuning.

11. In a superheterodyne panoramic receiver for examining radio frequency signals occupying a predetermined relatively wide radio frequency spectrum, a mixer, a frequency scanning local oscillator for generating frequency modulated local oscillations, means for applying said radio frequency signals and said local oscillations to said mixer for frequency conversion therein to frequency modulated products of conversion, a relatively narrow band amplifier for amplifying said products of conversion, means for frequency discriminating said products of conversion to provide successive signals of alternately different polarity, full wave rectifier means responsive to said successive signals of alternately different polarity for providing successive signals of identical polarity, means responsive to said last named signals for varying the translational characteristic of said intermediate frequency of said relatively narrow band amplifier to reduce its effective band width, and means synchronized with said scanning of said frequency scanning local oscillator for visually displaying in response to signals derived from said relatively narrow band amplifier the relative frequencies of said radio frequency signals.

JOSEPH I. HELLER.

(References on following page)

REFERENCES CITED

The following references are of record in the file of this patent:

UNITED STATES PATENTS

| Number | Name | Date |
|---|---|---|
| 2,128,661 | Mountjoy et al. | Aug. 30, 1938 |
| 2,183,980 | Wheeler | Dec. 19, 1939 |
| 2,189,282 | Foster | Feb. 6, 1940 |
| 2,217,294 | Rust | Oct. 8, 1940 |
| 2,245,365 | Riddle | June 10, 1941 |
| 2,258,599 | Carlson | Oct. 14, 1941 |
| 2,276,488 | Hershey | Mar. 17, 1942 |
| 2,371,397 | Koch | Mar. 13, 1945 |
| 2,372,419 | Ford et al. | Mar. 27, 1945 |
| 2,381,940 | Wallace et al. | Aug. 14, 1945 |
| 2,383,984 | Oberweiser | Sept. 4, 1945 |
| 2,395,738 | Hanson et al. | Feb. 26, 1946 |
| 2,445,562 | Cawein et al. | July 20, 1948 |
| 2,455,052 | Fisher | Nov. 30, 1948 |